United States Patent [19]

Scarpa et al.

[11] Patent Number: 5,245,024
[45] Date of Patent: Sep. 14, 1993

[54] CELLULOSE CHROMATOGRAPHY SUPPORT

[75] Inventors: Ioannis Scarpa, Chicago; Anita Beavins, Mokena, both of Ill.

[73] Assignee: Loyola University of Chicago, Chicago, Ill.

[21] Appl. No.: 778,188

[22] PCT Filed: Jun. 29, 1990

[86] PCT No.: PCT/US90/03716

§ 371 Date: Dec. 30, 1991

§ 102(e) Date: Dec. 30, 1991

[87] PCT Pub. No.: WO91/00297

PCT Pub. Date: Jan. 10, 1991

Related U.S. Application Data

[63] Continuation-in-part of Ser. No. 374,281, Jun. 30, 1989, abandoned.

[51] Int. Cl.$^5$ .............................................. C08B 3/30
[52] U.S. Cl. .................................. 536/56; 536/57; 536/84; 536/92; 536/98; 525/54.21; 525/54.1; 530/403; 530/404; 530/405; 530/814; 436/530
[58] Field of Search ............ 536/56, 57, 84, 92, 536/98; 525/54.21, 54.1; 530/403, 404, 405, 814; 436/530

[56] References Cited

U.S. PATENT DOCUMENTS

| | | | |
|---|---|---|---|
| 2,543,928 | 3/1951 | O'Neill et al. | 264/13 |
| 3,179,587 | 4/1965 | Battista et al. | 210/635 |
| 3,416,993 | 12/1968 | Heusser et al. | 428/323 |
| 3,562,289 | 2/1971 | Battista et al. | 548/344 |
| 3,597,350 | 8/1971 | Determann et al. | 210/111 |
| 4,055,510 | 10/1977 | Peska et al. | 252/426 |
| 4,063,017 | 12/1977 | Tsao et al. | 536/57 |
| 4,110,529 | 8/1978 | Stoy | 528/491 |
| 4,312,980 | 1/1982 | Motozato et al. | 536/76 |
| 4,577,013 | 3/1986 | Merz et al. | 536/43 |
| 4,697,007 | 9/1987 | Seitz et al. | 536/83 |
| 4,902,792 | 2/1990 | Okuma et al. | 536/57 |
| 4,918,180 | 4/1990 | Huybrechts | 536/61 |
| 4,946,953 | 8/1990 | Okuma et al. | 536/57 |
| 5,026,841 | 6/1991 | Francotte et al. | 536/865 |
| 5,064,950 | 11/1991 | Okuma et al. | 536/124 |

FOREIGN PATENT DOCUMENTS

| | | |
|---|---|---|
| 180898 | 9/1979 | Czechoslovakia . |
| 188698 | 7/1981 | Czechoslovakia . |
| 203767 | 6/1983 | Czechoslovakia . |
| 206378 | 10/1983 | Czechoslovakia . |
| 212130 | 5/1984 | Czechoslovakia . |
| 212131 | 5/1984 | Czechoslovakia . |
| 217458 | 5/1984 | Czechoslovakia . |
| 216775 | 7/1984 | Czechoslovakia . |
| 213352 | 8/1984 | Czechoslovakia . |
| 224844 | 11/1984 | Czechoslovakia . |
| 225503 | 12/1984 | Czechoslovakia . |
| 221883 | 6/1985 | Czechoslovakia . |
| 225376 | 6/1985 | Czechoslovakia . |
| 225971 | 7/1985 | Czechoslovakia . |
| 225017 | 2/1986 | Czechoslovakia . |
| 229010 | 3/1986 | Czechoslovakia . |
| 235645 | 11/1986 | Czechoslovakia . |
| 237930 | 3/1987 | Czechoslovakia . |
| 249311 | 1/1988 | Czechoslovakia . |
| 248821 | 9/1988 | Czechoslovakia . |
| 230297 | 10/1988 | Czechoslovakia . |
| 257144 | 11/1988 | Czechoslovakia . |
| 261537 | 5/1989 | Czechoslovakia . |
| 261538 | 5/1989 | Czechoslovakia . |
| 48-21738 | of 1973 | Japan . |
| 63-090502 | 4/1988 | Japan . |
| 63-092602 | 4/1988 | Japan . |
| WO9100297 | 1/1991 | PCT Int'l Appl. . |
| 501495 | 2/1937 | United Kingdom . |

OTHER PUBLICATIONS

Shigaru, O., et al., CA Selects: Ion-Containing Polymers, 24: p. 6, (1988).
Kuga, S., J. of Chromatography, 195: 221-230 (1980).
Motozato, Y., et al., J. of Chromatography, 298:499-507 (1984).
"PHARMACIA Data Sheet", pp. 23-26, DEAE-Sephacel.
PHARMACIA Data Sheet, DEAE-Sephacel.
Loth, et al., Makromol Chem., Macromol Symp. 30, 273-287, 1989.
Gensrich et al. Chemical Abstract vol. 95 No. 99587t 1981.

Primary Examiner—Nathan M. Nutter
Attorney, Agent, or Firm—Marshall, O'Toole, Gerstein, Murray & Borun

[57] ABSTRACT

This invention relates to an improved cellulose chromatography support and, in particular, to substantially spherical, high density cellulose particles. This invention also relates to a method of making these spherical, high density cellulose particles and, in particular, to a method for forming spherical cellulose from a high molecular weight viscose in a stable emulsion of a liquid carrier and emulsifying agents.

18 Claims, 2 Drawing Sheets

CELLULOSE CHROMATOGRAPHY SUPPORT

This application is the national phase of PCT International Application No. U.S. 90/03716, filed Jun. 29, 1990, which is a continuation-in-part of U.S. application Ser. No. 07/374,281, filed Jun. 30, 1989, now abandoned.

This invention relates to an improved uncrosslinked cellulose chromatography support and, in particular, to a support comprising substantially spherical, high density cellulose particles. This invention also relates to a method of making such substantially spherical, high density cellulose particles and, in particular, to a method for making spherical cellulose particles from viscose in a stable emulsion of a liquid carrier and emulsifying agents.

BACKGROUND OF THE INVENTION

Cellulose and cellulose derivatives have been used as chromatographic supports and as polymeric carriers. General chromatographic uses include analytical and preparative column chromatography, thin layer chromatography, ion exchange, gel chromatography and chelation and affinity sorbents. In addition, cellulose particles may be used as fillers and bulking agents in pharmaceuticals, cosmetics, and food products. Although natural abundance and availability, coupled with a variety of known derivatization schemes, make cellulose an attractive chromatographic support, it has generally suffered from several disadvantages. The most notable disadvantages are mechanical instability and poor flow characteristics.

Cellulose is a naturally occurring polymer made of linked glucose monomers. In the native state, adjacent polymeric glucose chains are extensively hydrogen bonded in some regions and less hydrogen bonded in others. The regions of relatively high hydrogen bonding are generally referred to as "microcrystalline regions" while the less hydrogen bonded regions are referred to as amorphous regions. For chromatographic applications, it is generally desirable to limit the amorphous regions, and to utilize cellulose having either a fibrous or a microgranular form. Such fibrous and microgranular materials are generally prepared by limited acid hydrolysis of bulk cellulose which results in the preferential loss of interchain amorphous regions and increases the microcrystalline regions. Both fibrous and microgranular cellulose compositions are generally referred to as microcrystalline cellulose.

Procedures typically used to prepare microcrystalline cellulose generally result in aggregated particles which require grinding and particle size separation to yield materials suitable for chromatographic purposes. Further, the individual microcrystalline cellulose particles are relatively irregularly shaped and fragile. These features adversely effect the use of these types of materials as chromatographic beds or columns because microcrystalline cellulose tends to easily clog and compact. In addition, these materials tend to break down and generate fines when subject to elevated pressure. These drawbacks can result in unacceptable flow characteristics and poor chromatographic separations.

The use of cellulose in the form of crosslinked beads or spherical particles may partially overcome the poor flow characteristics of microcrystalline cellulose chromatographic supports. When cellulose is made into beads using known procedures, however, the porosity of the cellulose particles and their wide range of sizes cause the beads to be subject to mechanical breakdown when used in packed beds or columns. Although, mechanical stability may be improved by the addition of cross linking agents, these crosslinking agents may increase the expense of the support, complicate the manufacturing processes and limit the general applicability of use of the support.

Further, when placed in aqueous solutions, porous cellulose particles typically swell significantly. Swelled, porous cellulose beads suffer from sensitivity to changing ionic strengths in eluting buffers and solvents. As a result, conventional, swellable cellulose supports must therefore be used within a specified narrow range of ionic strengths. If this specific range of ionic strengths is exceeded, the swelled cellulose particles compact or shrink which results in very poor flow characteristics and leads to either poor chromatographic separation or to no separation at all.

Several methods of preparing spherical cellulose particles are known. One method for preparing cellulose beads extrudes a viscose at high speed through a nozzle into a spinning acidic coagulating bath. Another method forms a dispersion in an organic solvent with a surfactant and then coagulates the suspension by pouring it into an acid solution. These procedures generate porous cellulose particles of variable and uncontrolled size distribution and suffer from the undesired formation of aggregates, agglomerates, and conglomerates of irregular and deformed shapes. These problems are believed due to the coagulation of the cellulose under changing hydrodynamic conditions. A third procedure thermally forms cellulose particles by heating an aqueous suspension of low molecular weight sodium cellulose xanthate in a stirred, relatively low viscosity, water-immiscible liquid. Although this procedure uses a relatively-constant, hydrodynamic environment for bead formation, the thermal decomposition of the sodium cellulose xanthate results in porous particles having a wide range of sizes.

There exists a need for a spherical, high density cellulose chromatographic support which has excellent mechanical stability, which may be used over a wide range of pH values and ionic strengths, and which may be readily prepared by a reproducible general method which provides uniformly sized and shaped particles.

SUMMARY OF THE INVENTION

It is an object of this invention to overcome one or more of the problems listed above.

The present invention encompasses a cellulose chromatographic support comprising substantially spherical, high density cellulose particles where the particles have a bulk dry density of about 0.65 to 0.85 g/ml, where each of the particles have an average diameter in the range of less than about 200 microns and where the particles are essentially nonswelling in aqueous or organic solutions. Preferably, the cellulose particles are further characterized by i) increased stability in solutions of various ionic strengths and hydrogen bond breaking capability, including solutions up to at least 3.0 M potassium chloride and 8 M urea, respectively; ii) stability over a pH range from about 3 to 12; iii) compatibility with both aqueous and organic solvents; iv) capability to be modified with chromatographic ligands; and v) excellent flow rates when used as a column chromatography support.

The spherical cellulose particles of the present invention may be chemically modified by covalently binding chromatographic ligands to the particles in high loading ratios, where the loading ratio is defined as the moles of ligand to the mass of particles. Preferred ligands include covalently bound polar and nonpolar ligands. Suitable ligands may include aminoethyl, diethylaminoethyl, epichlorohydrin triethanol amine, polyethyleneimine, methyl polyethyleneimine, benzyldiethylamine ethyl, diethyl-[2hydroxypropyl]-aminoethyl, triethylaminoethyl, sulphopropyl, carboxymethyl, sulphonate, quaternary ammonium ethyl, antigens and antibodies. A particularly preferred ligand is a polyethyleneimine which allows the modified support to be used as an ion exchange support.

The present invention also encompasses a method of making substantially spherical, high density cellulose particles comprising the steps of: i) forming a stable emulsion of technical viscose in the presence of at least one emulsifying agent and a liquid carrier, where the temperature of said viscose during the formation of the emulsion does not thermally decompose said viscose; ii) regenerating cellulose from said viscose in the absence of acid over a period of time, with continuous agitation under stationary hydrodynamic conditions, to yield a dispersion of uniformly sized, deformable particles; iii) contacting said dispersion of deformable particles with a solvent suitable to cause a partial extraction of said liquid carrier from said emulsion, wherein said deformable particles begin to partially harden, and; iv) hardening the deformable particles. The preferred temperature for formulating the emulsion and regenerating the cellulose is less than 30° C., and most preferably at temperatures of about 20 to 30° C. The regeneration of cellulose from viscose preferably extends over a period of about six to eighteen hours. A suitable liquid carrier has a viscosity greater than about 100 cSt at ambient temperatures.

Preferred high viscosity liquid carriers have viscosities greater than 150 cSt as measured using standard techniques at ambient temperatures; the most preferred carrier is polypropylene glycol having an average molecular weight of about 1200 and a viscosity of about 160 cSt at temperatures of about 20 to 30° C.

The spherical particles may be further hardened by stirring the partially hardened particles in an acidic alcoholic solution preferably a solution comprising 30% acetic acid in ethanol, a solution comprising 30% propanoic acid in propanol, or a solution comprising 20% phosphoric acid in ethanol.

Other objects and advantages of this invention will be apparent upon consideration of the following detailed description which includes illustrative examples of the practice of the invention.

DETAILED DESCRIPTION

This invention relates to a cellulose chromatographic support comprising substantially spherical, high density cellulose particles where the particles of the invention have a bulk dry density of about 0.65 to 0.85 g/ml, where each of the particles have an average diameter of less than about 200 microns, and where the particles are essentially nonswelling in aqueous or organic solutions.

The phrase "essentially nonswelling," as used herein, refers to cellulose particles which do not appreciably change in volume when contacted with either aqueous or organic solvents or solutions. That is, the cellulose particles of the present invention are resistant to both swelling and contracting when placed in a variety of organic solvents of different dielectric constants or polarities. No appreciable change in volume occurs in nonpolar solvents such as hexane, toluene, and benzene or in polar solvents such as water, dimethylsulfoxide, dimethylformamide, or N-methyl pyrrolidone. In addition, hydrogen bond breaking solvents, such as 8 M urea, do not result in any volume change. This property may be contrasted with known cellulose beads which swell to a large extent when placed in water or other solvents. It is believed that the volume retention properties of the spherical particles of this invention are related to the relatively high density and the correspondingly low porosity of the particles. For example, 10 to 25 micron particles have a bulk dry apparent density of 0.8045 g/ml; 25 to 53 micron particles have an apparent density of 0.7923 g/ml; and 53 to 177 micron particles have an apparent density of 0.6789 g/ml.

Figure 1:
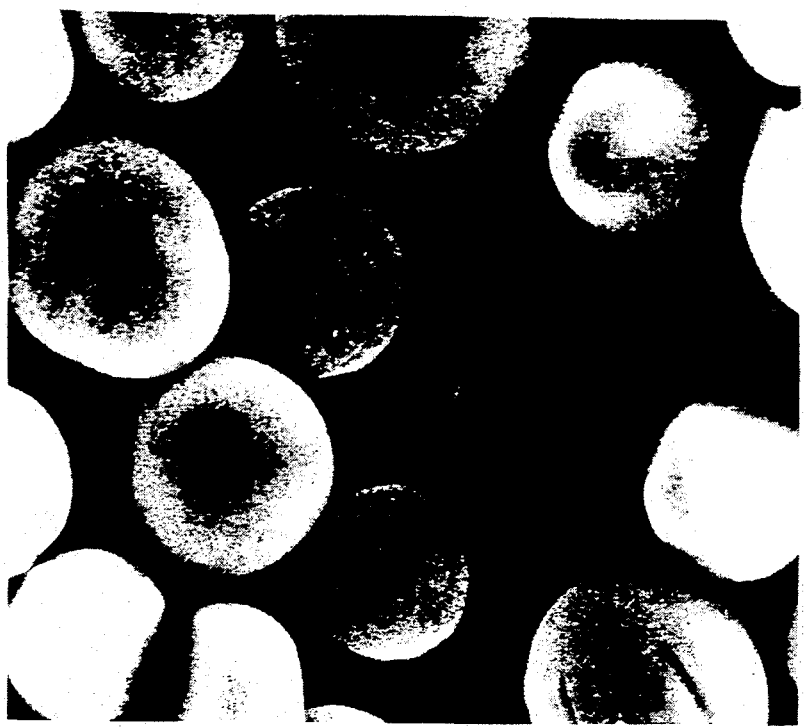
FIG. 1 is a photomicrograph (magnification 500×) of spherical cellulose particles having a diameter of between about 25 to 45 microns.
Figure 2:
FIG. 2 is a photomicrograph (magnification 2000×) of a single cellulose particle that was mechanically cut in half.
Figure 3:
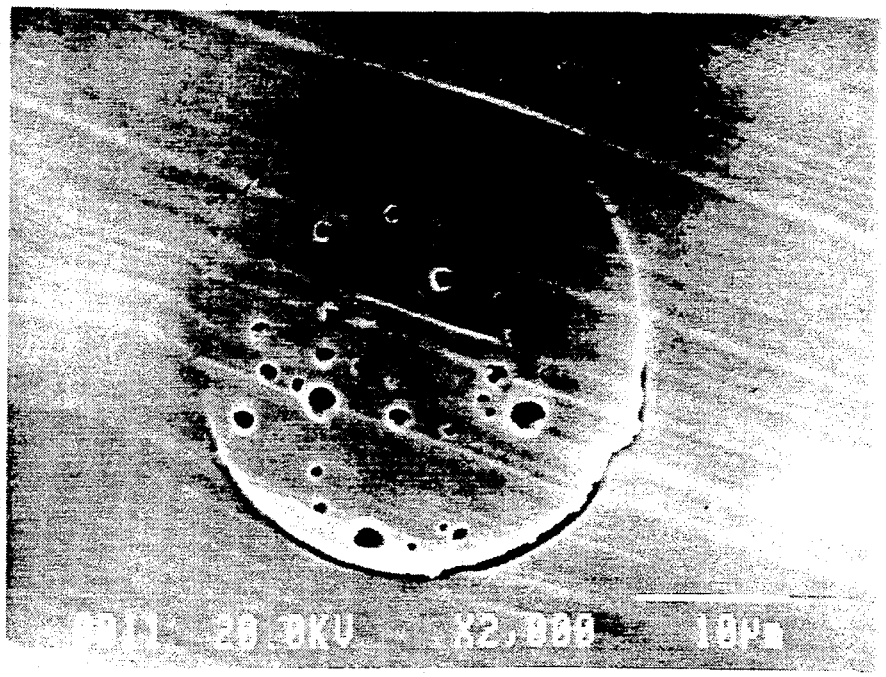
FIG. 3 is also a SEM photomicrograph of a cellulose particle imbedded in a polymer film that was also cut in half (magnification 2000×).

As illustrated by FIGS. 2 and 3 the particles of the present invention have very low porosity. The particles are substantially solid when viewed under a microscope or by SEM a at magnification of 2000X. The photomicrographs illustrated in FIGS. 1 and 2 were taken on a JEOL Model JSM-354 scanning electron microscope. The photomicrograph illustrated in FIG. 3 was taken on a JEOL Model 840 scanning electron microscope. The cellulose particle shown in the photomicrograph was imbedded in a collodion polymer film and then cut in half.

The cellulose particles may be chemically modified to covalently bind chromatographic ligands to the particles. Suitable ligands include any of a variety of known polar or nonpolar ligands. Polar ligands may be either cationic or anionic compounds and nonpolar ligands may be uncharged or neutral compounds. In particular, covalently bound polyethyleneimines allow the modified supports to be used as ion exchange supports. Other known ligands may give useful supports for affinity, reverse phase and hydrophobic chromatography. Suitable ligands may include aminoethyl, diethylaminoethyl, epichlorohydrin triethanolamine, polyethyleneimine, methyl polyethyleneimine, benzyldiethylamine ethyl, diethyl-[2-hydroxy propyl]-aminoethyl, triethylaminoethyl, sulphopropyl, carboxymethyl, sulphonate, quaternary ammonium ethyl, antigens and antibodies.

Known chromatographic ligands can be covalently bound to the hydroxyl groups on the accessible surfaces of the particles using difunctional linking molecules which have two reactive sites associated with each molecule. Any difunctional linking molecule known to react with hydroxyl groups of cellulose may be used. Particularly preferred linking groups with two reactive sites include epichlorohydrin, benzoquinone, and diglycidyl ethers of alkane diols. In performing this binding step, the linking group is typically contacted with the cellulose particles under conditions suitable to covalently bind to the cellulose using one reactive site on the linking molecule. The resulting intermediate is then contacted with a known, reactive chromatographic ligand which binds to the second reactive site of the linking group. Suitable reactive chromatographic ligands are any of a variety of ligands well known to those skilled in the art. A preferred ligand used to form an ion exchange chromatographic support is a reactive polyethyleneimine.

The cellulose particles of this invention possess several desired characteristics. For example, the cellulose particles of this invention are mechanically stable. No mechanical breakdown of the particles occurred under intense magnetic stirring in various organic solvents or in acidic aqueous solutions for time periods of between five and twelve hours.

The cellulose particles are also stable to elevated pressures when used in chromatographic columns. The spherical cellulose particles provide excellent flow rates over a range of pressures and conditions. For example, when the cellulose particles were packed in a column and subjected to medium pressure conditions provided by a fluid metering pump there was no mechanical breakdown at pressures up to at least 120 psi for extended periods of time and there was no appreciable decrease in the flow rates or in the volume of the chromatographic bed as the pressure was increased.

The method for making substantially spherical, high density cellulose particles of this invention comprises the steps of: i) forming a stable emulsion of technical viscose in a liquid carrier without thermally decomposing the viscose; ii) regenerating the cellulose to give deformable spherical particles; and, iii) further hardening the deformable particles.

The phrase, "technical viscose," as used herein, means an aqueous solution generated from pulp containing high molecular weight cellulose, sodium hydroxide, and sulfur which results from the substitution of hydroxyl groups with xanthate groups. A suitable viscose may contain about 7.0% high molecular weight cellulose, about 5.0% sodium hydroxide and about 1.7% sulfur. This viscose may have about 20% of the hydroxyl groups of the cellulose substituted with xanthate groups. A description of the process to generate suitable viscose from wood pulp is found in U.S. Pat. No. 4,778,639.

The phrase, "liquid carrier," as used herein, means a liquid solvent preferably having a viscosity greater than 100 cSt at ambient temperatures and more preferably greater than about 150 cSt at temperatures of about 20 to 30° C. which is capable of forming a stable emulsion with viscose in the presence of emulsifying agents. The phrase "stable emulsion", as used herein, means an emulsion of viscose formed in the liquid carrier using emulsifying agents such that the emulsion does not break down during the time period required to regenerate cellulose from viscose A stable emulsion is preferred because the regeneration of cellulose from viscose may be allowed to occur in a controlled manner. If the regeneration is uncontrolled or if the generation of carbon disulfide during the regeneration is too rapid a very porous product is formed. In addition, if the emulsion breaks down during the regeneration period, the developing particles are likely to lose the desired spherical shape and are likely to form undesired irregularly shaped aggregates and agglomerates.

It was empirically observed that the combination of low viscosity solvents and high molecular weight viscose typically did not generate stable emulsions. For example, emulsifying agents and relatively low viscosity solvents such as dichlorobenzene, chloroform, chloroform and paraffin, paraffin, hexane, cyclohexane, silicone oil, mineral oil, and toluene all failed to provide stable emulsions with high molecular weight viscose. In general, the inability to generate stable emulsions leads to large unusable clumps of partially dexanthated cellulose instead of spherical cellulose particles.

It was also observed that as the viscosity of the solvent increased, the stability of the emulsion increased. For example, Arcoprime, (viscosity about 78.5 cSt), generated a relatively poor emulsion but yielded particles of irregular sizes and shapes. High viscosity solvents such as polypropylene glycol 1200 (viscosity about 160 cSt), Polymeg 650 (viscosity about 650 cSt) and Cargille type B immersion oil (viscosity about 1250 cSt) yielded stable emulsions when used in conjunction with emulsifying agents and also resulted in satisfactory spherical particles. A preferred solvent is polypropylene glycol 1200.

The emulsifying agents may be optimized to vary the stability of the emulsions. Preferred emulsifying agents, used in combination with polypropylene glycol having an average molecular weight of about 1200, include sorbitan monooleate and Tween-80® (polyoxyethylene (20) sorbitan monooleate) and Trylox CO-5®. A preferred weight percent ratio of sorbitan monooleate to Tween-80® in polypropylene glycol is about 75-98 wt.% sorbitan monooleate and 2-25 wt.% Tween-80®. Particularly preferred weight percent ratios of sorbitan monooleate to Tween-80® in polypropylene glycol are 80-20 wt.% and 96.5-3.5 wt.% respectively. A preferred weight percent ratio of sorbitan monooleate to Trylox CO-5® in polypropylene glycol is about 9-30 wt.% sorbitan monooleate and 70-91 wt.% Trylox CO-5®. A particularly preferred weight percent ratio is 9.724 wt.% sorbitan monooleate and 90.276 wt.% Trylox CO-5®.

A suitable test to determine an optimized emulsion system may be readily performed by making up a a sample mixture by adding technical viscose (0.3 ml) to polyethylene glycol having a average molecular weight of about 1200 (1.5 ml) that had been previously vortexed with varying weight percentages of emulsifiers (0.1 ml). The sample mixture is vortexed for one minute, and the mixture is used to fill Wintrobe erythrocyte sedimentation tubes. Two tubes for each mixture are used and the tubes are then centrifuges for 5 minutes. A ratio is taken between the amount of viscose still emulsified after centrifugation and the total volume of fluid in the sedimentation tube. The emulsions with the highest ratios of the amount of emulsified viscose to the total fluid volume are considered to have the optimum emulsifier concentrations. The emulsion system test is typically run in duplicate and the results are averaged. Small differences in viscose temperature, room temperature, or exact time of centrifugation are corrected for by using the an optimum concentration from an earlier run as control.

Another method to determine the stability of a particular emulsion system may be performed by a visualization test. To perform the test, a drop of a viscose emulsion to be visualized is placed on a clean glass slide, and another slide is placed on top of this drop, slightly offset. The bottom slide is then held at a downward angle, allowing the top one to slowly slide down, resulting in one layer of emulsion droplets on the original slide. This slide is then allowed to dry in a vertical position. After drying for about 2 days, the slide is placed in a coplin jar filled with acetone for about 1 or 2 days in order to remove the remaining solvent. After removal of the solvent from the slide, the slide is viewed directly under a microscope under low power, which allows visualization of the size of the emulsified viscose at the time the emulsion is forming.

Using these simple tests it is possible to define the weight percent concentration of the emulsifies in the liquid carrier to about one thousandth of a percent. This accuracy is preferred in order to achieve an optimized emulsion system to practice the method of this invention.

When a technical viscose is used to make cellulose particles according to the present invention, a salt solution is preferably added to the viscose. The resulting spherical particles are obtained and these spheres are smaller than the particles obtained using the same process but which are formed without adding a salt solution to the viscose emulsion. Typical salt solution may include aqueous potassium chloride solutions.

Another method for producing smaller spheres is to increase blending time when forming the viscose emulsion.

The formation of desired spherical cellulose particles in the absence of acid is also dependent on the temperature used to form the emulsion and the temperature used to regenerate the cellulose from the viscose. At temperatures above room temperature, as the temperature is increased, the range of the size distribution of the particles is generally increased, the particles are more susceptible to forming aggregates and clumps and the particles may be softer and more porous depending on ambient pressure. Preferably, when practicing the method of this invention at atmospheric pressure, the temperature is maintained below about 30° C; the most preferred emulsifying and regenerating temperatures are in the range of about 20 to 30° C. Increasing the ambient pressure and lowering the temperature below about 20° C. may produce particles with reduced porosity; however, the regeneration time is increased and the production rate is reduced accordingly. It has also been observed that the final temperature of the emulsion is lower when the solvents used are stored under refrigeration and the temperature of the blender cooling bath is low.

The particles obtained after regeneration are relatively soft and may be easily deformed if mishandled. Therefore, the regenerated cellulose particles are preferably suspended in a nonpolar solvent such as hexane or toluene, in order to extract the liquid carrier and to initiate particle hardening. Further hardening occurs by stirring the particles in an acidic alcoholic solution, such as 30% acetic acid in ethanol, 30% propanoic acid in propanol, or 20% phosphoric acid in ethanol. Preferably, the hardening of the particles in an acidic alcoholic solution is done at low temperatures in the range of about −30° to 30° C.

As a final step in the process, the hardening of the particles may be accelerated by contacting the particles with stepped gradients of dimethylsulfoxide and t-butylmethyl ether, dimethylsulfoxide and diethyl ether, or dimethylsulfoxide and propanol solutions at temperatures of about −30° to 30° C.; at higher temperatures, the reaction is faster, at lower temperatures, the resulting particles are more uniform.

The substantially spherical, high density cellulose particles of this invention are useful in a variety of applications. When the cellulose particle is modified with a polar chromatographic ligand, the material may be used as a high performance, thin layer chromatographic sorbent to separate biological materials such as nucleic acids, oligonucleotides or related compounds. The same modified material may be used in a small column as an ion exchange sorbent to purify biomolecules. When the cellulose particle is modified with a nonpolar chromatographic ligand, the material may be used in solid phase extractions such as in analytical drug testing procedures or in extracting difficult-to-remove organic materials from aqueous solutions. In the unmodified state, the exceptional physical characteristics of the cellulose particles of this invention allow the particles to be used as bulking agents or fillers in cosmetic, pharmaceutical or food products.

Several examples describing various embodiments of the invention are given below. These examples are for illustrative purposes only and are not intended to limit the scope of the invention.

EXAMPLE 1

Cargille Type B immersion oil (200 ml, viscosity 1250 cSt) was blended briefly with 80 wt.% sorbitan monooleate and 20 wt.% Tween-80® (1.064 g, total weight of surfactants) and added to a solution of technical viscose (33.5 ml) diluted with water (33.5 ml). The mixture was blended, utilizing the highest speed of a Hamilton Beach blender for two minutes, heated at a constant temperature of 38° C. and stirred overnight at a speed of 377 rpm. Cyclohexane (100 ml) was added to the reaction mixture; the resulting particles were filtered, and washed with ethanol. The particulate matter was then stirred in 40% acetic acid in ethanol. After stirring for one hour, the particles were washed with 1-propanol and then soaked in mixtures of solvents, described below, for a period of up to one hour per solvent mixture. The first solvent used was 100% dimethylsulfoxide (DMSO), followed by solutions of 75% DMSO/25% t-butylmethyl ether (TBME), 50% DMSO/50% TBME, 25% DMSO/75% TBME, and 100% TBME. After the last wash with TBME, the beads were suction dried on a glass filter funnel. The following size distribution was observed after dry sieving: 53-177 microns-90%; 25-53 microns-10%.

EXAMPLE 2

Technical viscose (33.5 ml) was added to water (33.5 ml), and stirred until a homogenous viscose solution was obtained. Arcoprime 350® (200 ml, viscosity 78.9 cSt) was blended for 10–15 seconds with 80 wt.% sorbitan monooleate and 20 wt.% Tween-80® (1.064 g, total weight of surfactants) in a separate flask and the viscose solution was added to it. The resultant mixture was blended for two minutes at high speed, transferred to a reaction vessel and stirred at 400 rpm overnight at a constant temperature of 39° C. The resulting particles were washed and soaked in mixtures of solvents in the same manner as described in Example 1. The following size distribution was observed upon dry sieving: 53-177 microns-61%; 25-53 microns-29%; over 177 microns-10%.

EXAMPLE 3

Technical viscose (35 ml) was added to water (35 ml), and the resulting solution was added to polypropylene glycol (PPG) 1200 (200 ml, MW 1200, viscosity 160 cSt), which had been blended with an 80 wt.% sorbitan monooleate and 20 wt.% Tween-80® (1.064 g, total weight of surfactants). This mixture was blended for 30 seconds, blending was stopped for 15 seconds, and the same sequence was repeated four times for a total blending time of two minutes. The mixture was transferred to a reaction vessel and stirred overnight at 330 rpm at a constant temperature of 41° C. The resulting particles were centrifuged at 2500 rpm at 21° C., for two and one half minutes. The liquid phase was decanted from the particles, which were stirred in hexane and decanted. The particles were again stirred with hexane and decanted and then stirred with ethanol. The particles were filtered on a glass filter funnel, and treated with 30% acetic acid in ethanol. The resulting particles were soaked in mixtures of solvents and treated in the same manner as described in Example 1, except that ethanol was substituted for TBME. Finally, the particles were stirred in distilled water, filtered through a glass filter, and air dried. A qualitative molybdate test for the presence of sulfur and an elemental analysis for sulphur were both negative. The following size distribution was observed after dry sieving: 53-177 microns-97%; 25-53 microns-3%.

EXAMPLE 4

Technical viscose (100 ml) was added to water (100 ml), and the solution was added to PPG 1200 (600 ml), which had been blended with 80 wt.% sorbitan monooleate and 20 wt.% Tween-80® (1.064 g, total weight of surfactants). The experiment was carried out in the same manner as Example 3, except the reaction temperature was kept at 23° C. while stirring overnight. The following size distribution was observed after dry sieving: 53-177 microns-67%; 25-53 microns-32%; 10-25 microns-1%.

EXAMPLE 5

PPG 1200 (550 ml) was blended with 80 wt.% sorbitan monooleate and 20 wt.% Tween-80® (1.064 g, total weight surfactants) and added to technical viscose (100 ml, undiluted). The process was continued in the same manner as in Example 3, except that the reaction temperature was 24° C. The following size distribution was observed after dry sieving: 53-177 microns-97%; 25-53 microns-3%.

EXAMPLE 6

PPG 1200 (600 ml) was blended with 80 wt.% sorbitan monooleate and 20 wt.% Tween-80® (1.064 g, total weight of surfactants) and added to technical viscose (100 ml, undiluted). The mixture was emulsified at high pressure using a piston-type fluidizer and stirred in a reaction vessel overnight at 23° C. at 375 rpm. The process was continued in the same manner as in Example 3. The following size distribution was observed after dry sieving: 53-177- microns-82%; 25-53 microns-18%.

EXAMPLE 7

PPG 1200 (300 ml) was blended with 80 wt.% sorbitan monooleate and 20 wt.% Tween-80® (1.064 g, total weight of surfactants) and added to technical viscose (100 ml). The mixture was stirred in a reaction vessel at 500 rpm at a constant temperature of 22° C. The process was then continued in the same manner as in Example 3. The following size distribution was observed after dry sieving: 53-177- microns-82%; 25-53 microns-5%; over 177 microns-13%.

EXAMPLE 8

PPG 1200 (600 ml) was blended with 80 wt.% sorbitan monooleate and 20 wt.% Tween-80® (3.18 g, total weight of surfactants) and added to a solution of technical viscose (100.5 ml) and water (100.5 ml). The mixture was blended using a Waring Commercial Blender equipped with a cooling jacket and a cooling coil (temperature of circulating water, −10° C.) for four minutes at high speed. The mixture was stirred overnight at 200 rpm at 24° C. The process was then continued in the same manner as in Example 3. The following size distribution was obtained by dry sieving: 53-177- microns-11%; 25-53 microns-77%; 10-25 microns-8%; over 177 microns-4%.

EXAMPLE 9

PPG 1200 (600ml) was blended with an emulsifier (24 ml, 96.5 wt.% sorbitan monooleate and 3.5 wt.% Tween-80®) and added to undiluted viscose (200 ml). The process was then continued in the same manner as described in Example 8. The following size distribution was observed after dry sieving: 53-177 microns-72%; 25-53 microns-28%.

EXAMPLE 10

Polymeg 650 ®(polytetramethylene ether glycol, 300 ml) was blended with an emulsifier (12ml, 96.5% sorbitan monooleate and 3.5% Tween-80®) and added to undiluted viscose (100 ml). The mixture was blended using a Waring Commercial Blender equipped with a cooling jacket and a cooling coil (temperature of circulating water −10° C.) for 7 minutes at high'speed. The mixture was stirred at 628 rpm overnight at 24° C. After centrifuging at 2500 rpm for 2.5 minutes at 21° C., the liquid fraction was decanted and discarded. The particles were twice stirred in propanol and decanted. The particles were filtered and added to a solution of 20% phosphoric acid in ethanol. The particles were washed following the procedure describe in Example 3. The following size distribution was observed after dry sieving: 53-177 microns-98%; 25-53 microns-2%.

EXAMPLE 11

Technical viscose (100 ml) was diluted with a solution of 1 M potassium chloride (100 ml) and the resulting solution was added to a blended solution of PPG 1200 (500 ml), 95.9 wt.% sorbitan monooleate and 4.1 wt.% Tween-80® (22 ml total volume of surfactants). The formation of particles was carried out according the procedure described in Example 8 above. The following size distribution was observed by dry sieving: 25-53 microns-80%; 10-25 microns-20%. Microscopic examination showed a much higher percentage of particles in the 10-25 micron range with many particles having a size of less than 10 microns, but the low mass of these particles hindered separation using conventional sieves.

EXAMPLE 12

Technical viscose (100 ml) was diluted with an aqueous potassium chloride solution (5.56g KCl in 25 ml water) resulting in concentration of salt in the diluted viscose solution of about 1 M. The resulting solution was added to a blended solution of PPG 1200 (275 ml), 95.9 wt.% sorbitan monooleate and 4.1 wt.% Tween-80® (12 ml total volume of surfactants). The mixture was blended using a Waring Commercial Blender for 10 minutes on speed #6, followed by 2 minutes on speed #7 in the same manner as Experiment 8 and the formation of particles was carried out according to the procedure described in example 4 above. The following size distribution was observed by dry sieving: 25-53 microns-78%; 10-25 microns-22%. Microscopic examination showed a much higher percentage of the particles in 10-25 micron range in contrast to the distribution achieved through sieving, with many particles having a size of less than 10 microns, but the low mass of these particles prevented separation using conventional sieves.

EXAMPLE 13

Technical viscose (120 ml) was added to a blended solution of PPG 1200 (300 ml) 9.724 wt.% sorbitan monooleate and 90.276 wt.% Trylox CO-5® (22 ml total volume of surfactants, Trylox CO-5® manufactured by Emery was a castor oil ethoxylate containing 5 moles ethylene oxide per mole of castor oil). This mixture was blended for a total of 3 minutes on low speed, using a Waring Commercial Blender in the same manner as Example 8 and the formation of particles was carried out according to the procedures described as Example 4 above. The following size distribution was observed by dry sieving: 38-53 microns-52%; 25-38 microns 37%; 10-25 microns 11%.

EXAMPLE 14

Technical viscose (600 ml) was added to a blended solution of PPG 1200 (1500 ml), 30.0 wt.% sorbitan monooleate and 70.0 wt.% Trylox CO-5® (110 ml total volume of surfactants). This mixture was blended for a total of 3 minutes on low speed using a Waring Commercial Blender in the same manner as Example 8 and the formation of particles was carried out according to the procedures described in Example 4. The following size distribution was observed by dry sieving: 38-53 microns-86%; 25-38 microns-14%. The particles were mainly individual spheres, although there were also some clusters of spheres.

EXAMPLE 15

Technical viscose (125 ml) was added to a blended solution of PPG 1200 (250 ml) 0.725 wt.% sorbitan monooleate and 90.275 wt.% Trylox CO-5® (15 ml total volume of surfactants). This mixture was blended for a total of 15 minutes on medium speed using a Waring Commercial Blender in the same manner as Example 8 and the formation of particles was carried out according to the procedures described in Example 4 above. The following size distribution was observed by dry sieving: 38-53 microns-11%; 25-38 microns-82%; 10-25 microns-7%.

EXAMPLE 16

Cellulose particles (38-53 microns) were packed in a 8.5×0.8 cm Michel-Miller column using the slurry technique as described in the Ace Michel-Miller brochure. The column was packed at about 120 psi back pressure using a fluid metering pump. Solvent (water or a 2M KCl solution) was pumped through the bed at back pressures of about 100 psi over a period of 64 hours. Flow rates of 370 ml per hour were recorded at stable bed volume. Examination of the cellulose particles under the microscope (100×) showed no visible deformation of the particles.

Similarly, cellulose particles (38-53) microns) were dry packed in a 8.5×0.8 cm Michel-Miller column which was then connected to a fluid metering pump operating at about 40 psi back pressure. The bed volume increased upon wetting by about 6%. A volume of 5 liters of 2M KCl was passed through the column. The bed volume remained constant throughout the experiment.

EXAMPLE 17

Cellulose particles (20-38 microns) were allowed to soak in water for 2 hours, after which they were filtered on a fritted glass filter, allowed to air dry overnight at room temperature and then weighed (2.9917 g). The air dried particles were then dried in a vacuum dessicator for a period of 24 hours at reduced pressure ($10^{-3}$ mm Hg) and reweighed (final weight 2.7799 g). The weight lost due to remaining water absorbed on the particles was about 7%.

EXAMPLE 18

ATTACHMENT OF PEI TO CELLULOSE WITH BENZOQUINONE

Polyethyleneimine (PEI) was attached to cellulose using benzoquinone in the following manner. Cellulose (0.4117 g) was placed in contact with an acetate buffer (0.1 M, pH 5.4) for one hour and filtered. Fifty (50) ml of a solution prepared by dissolving Benzoquinone (1.6215 g) in a solution of ethanol (60 ml) and acetate buffer (240 ml) was added to the cellulose filtrate and the reaction vessel was rotated gently for one hour. The cellulose was filtered and washed with 0.5 M sodium chloride and acetate buffer until the wash was unreactive to base. A solution of $PEI_{18}$ (111.3 mg) in ethanol (100 ml) was then added to the wet cellulose. The mixture was protected from light and the reaction vessel was rotated gently overnight. The resulting solid was washed with acetate buffer (500 ml), sodium chloride (500 ml), and methanol (500 ml). Acetic acid (20%) in acetate buffer was added to the solid, the mixture was vortexed, centrifuged, decanted and blotted. This sequence was repeated four times. The particles were qualitatively tested for the presence of amines and the results of the test were positive, indicating the covalent attachment of PEI to the cellulose particle.

EXAMPLE 19

ATTACHMENT OF PEI TO CELLULOSE WITH EPICHLOROHYDRIN

PEI was attached to cellulose using epichlorohydrin in the following manner. Cellulose particles (1.0 g) were equilibrated with acetate buffer (0.1 M, pH 5.4) for one hour and filtered. A sodium borohydride solution (5 ml, made by mixing sodium hydroxide (500 ml, 2N), sodium borohydride (2.5 g) and diluting the mixture 1:2 with water) was added to the equilibrated cellulose particles. Epichlorohydrin (1.0 ml) was added to the mixture and the reaction vessel was rotated gently at 60° C. for one hour. The mixture was washed with warm water (60° C.), and mixed with a PEI18 solution (4 ml, 37 mg PEI/ml), and the reaction vessel was rotated for an additional 30 minutes at 60° C. The product was then washed with hot brine. Elemental analysis: 3.03% nitrogen, corresponding to 96.06 mg PEI bound per 1.0 g cellulose.

EXAMPLE 20

ATTACHMENT OF PEI TO CELLULOSE WITH A DIGLYCIDYL ETHER

A solution (1 ml, sodium hydroxide (0.6 M) containing sodium borohydride, 2 mg) was added to 1,4-butanediol diglycidyl ether (1.0 ml). The mixture was added to cellulose (1.0 g) and the reaction vessel was rotated for seven hours at 30° C. The cellulose was washed with water and added to a solution (4 ml) containing $PEI_{18}$ (148.78 mg). The reaction vessel was rotated at 35° C. for 30 minutes and the product was washed with warm water (80-90° C.) and aqueous NaCl/NaOH (1 M). Elemental analysis: 3.60% nitrogen, corresponding to 110.57 mg PEI bound per 1.0 g cellulose.

We claim:

1. A chromatographic support comprising substantially spherical, non-cross-linked, high density cellulose particles wherein said particles have a bulk dry apparent density of about 0.65 to 0.85 g/ml, wherein said particles have an average diameter in the range of from about 25 microns to about 200 microns, and wherein said particles are essentially nonswelling in aqueous or organic solutions.

2. The cellulose particles according to claim 1 wherein said particles are stable in aqueous solutions of up to at least 3.0 M potassium chloride and 8 M urea.

3. The cellulose particles according to claim 1 further comprising chromatographic ligands covalently bound to said particles.

4. The cellulose particles according to claim 3 comprising polar chromatographic ligands covalently bound to said particles.

5. The cellulose particles according to claim 3 comprising nonpolar chromatographic ligands covalently bound to said particles.

6. The cellulose particles according to claim 4 wherein said covalently bound ligands are selected from the group consisting of aminoethyl, diethylaminoethyl, epichlorohydrin triethanolamine, polyethyleneimines, methyl polyethyleneimines, benzyl diethylamine ether, diethyl-[2-hydroxypropyl]aminoethyl, triethylaminoethyl, sulphopropyl, carboxymethyl, sulphonate, quaternary ammonium ethyl, antigens and antibodies.

7. The cellulose particles according to claim 1 wherein said particles are stable at pressures up to 120 psi.

8. The cellulose particles according to claim 1 wherein said particles are mechanically stable.

9. A method of making substantially spherical, high density cellulose particles comprising the steps of:
 forming a stable emulsion of viscose in the presence of at least one emulsifying agent and a liquid carrier, wherein the temperature of said viscose during the formation of said emulsion does not thermally decompose said viscose;
 regenerating cellulose from said viscose in the absence of acid over a period of time with continuous agitation under stationary hydrodynamic conditions to yield a dispersion of uniformly sized, deformable particles;
 contacting said dispersion of deformable particles with a solvent suitable to cause a partial extraction of said liquid carrier from said emulsion, wherein said deformable particles begin to partially harden; and
 hardening said deformable particles whereby high density particles having an average diameter in the range of from about 25 microns to about 200 microns are produced.

10. The method according to claim 9 wherein said temperature is above the freezing point of said emulsion, but less than 30°.

11. The method according to claim 10 wherein said temperature is about 20° to 30° C.

12. The method according to claim 9 wherein said liquid carrier has a viscosity greater than 150 cSt at temperatures of about 20° to 30° C.

13. The method according to claim 12 wherein said liquid carrier is polypropylene glycol having an average molecular weight of about 1200 and a viscosity of about 160 cSt at temperatures of about 20° to 30° C.

14. The method according to claim 9 wherein said emulsion is formed in the presence of at least two emulsifying agents.

15. The method according to claim 14 wherein said emulsifying agents are neutral surfactants selected from the group consisting of sorbitan, polyoxyethylene (20) sorbitan monooleate and a castor oil ethoxylate.

16. The method according to claim 9 wherein said particle hardening comprises stirring said deformable particles in an acidic alcoholic solution.

17. The method according to claim 9 further comprising adding a salt solution to the viscose emulsion.

18. Spherical, high density cellulose particles made by a method comprising the steps of:
 forming a stable emulsion of viscose in the presence of at least one emulsifying agent and a liquid carrier, wherein the temperature of said viscose during the formation of said emulsion does not thermally decompose said viscose;
 regenerating cellulose from said viscose in the absence of acid over a period of time with continuous agitation under stationary hydrodynamic conditions to yield a dispersion of uniformly sized, deformable particles;
 contacting said dispersion of deformable particles with a solvent suitable to cause a partial extraction of said liquid carrier from said emulsion, wherein said deformable particles begin to partially harden; and
 hardening said deformable particles to produce high density particles having an average diameter in the range of from about 25 microns to about 200 microns.

* * * * *